United States Patent

[11] 3,608,954

[72] Inventor  Orland R. Lynd
              940 Larch St. Apt. 6, Inglewood, Calif. 90301
[21] Appl. No. 825,221
[22] Filed     May 16, 1969
[45] Patented  Sept. 28, 1971

[54] COLLAPSIBLE VEHICULAR STRUCTURE
     9 Claims, 9 Drawing Figs.
[52] U.S. Cl. ................................................. 296/23, 296/26
[51] Int. Cl. ................................................. B60p 3/34
[50] Field of Search ........................................ 296/23.3, 23, 26, 27

[56]                References Cited
                UNITED STATES PATENTS
2,193,352  3/1940  Thomas ........................  296/23.3
2,538,736  1/1951  Spencer .......................  296/23.3
3,494,655  2/1970  Linton ........................  296/27

Primary Examiner—Philip Goodman
Attorney—Smyth, Roston & Pavitt

ABSTRACT: This disclosure describes a collapsible vehicular structure which includes a vehicular cabin having a peripheral sidewall and an upper wall and a cabin extension having a peripheral sidewall and a roof. The cabin extension is mounted on the vehicular cabin with the peripheral sidewalls thereof being telescopically interrelated to thereby provide a collapsible second story for the vehicular cabin.

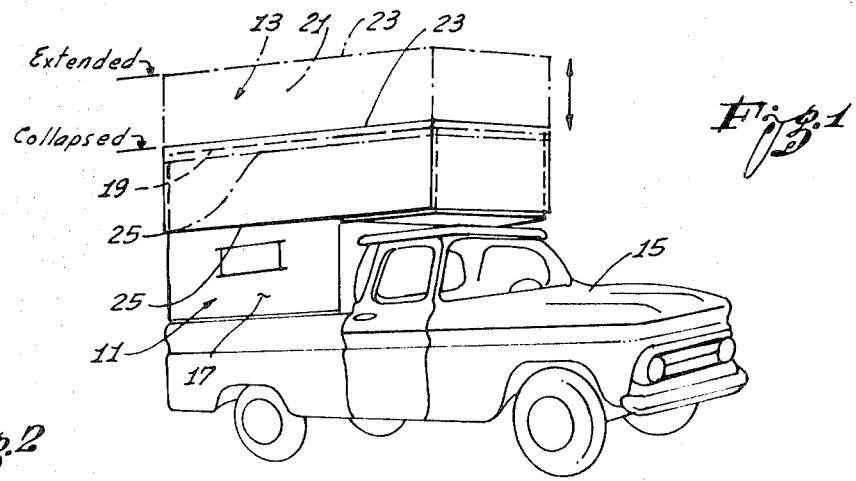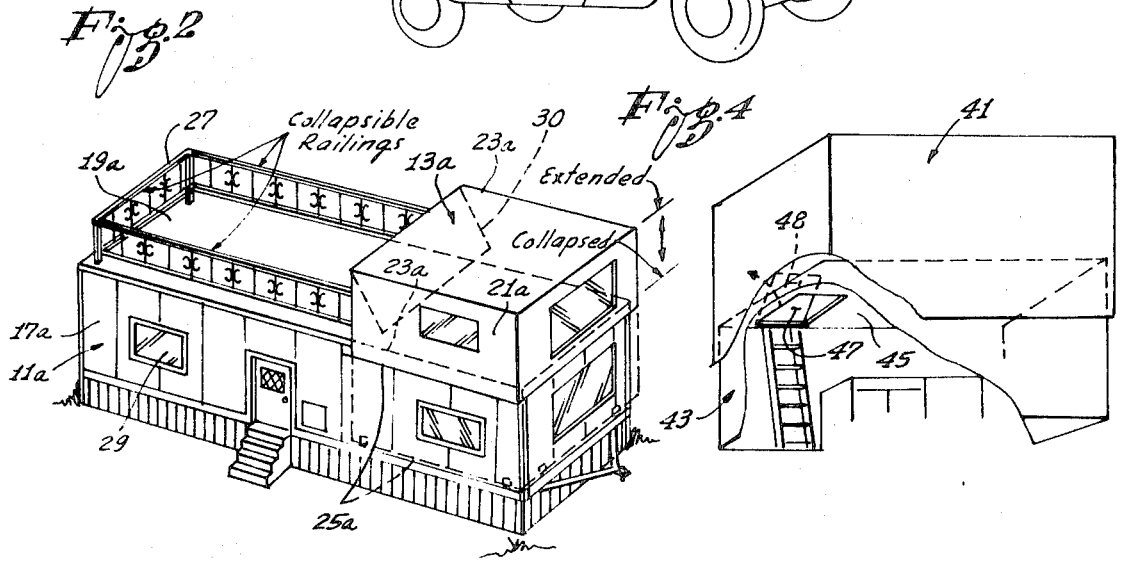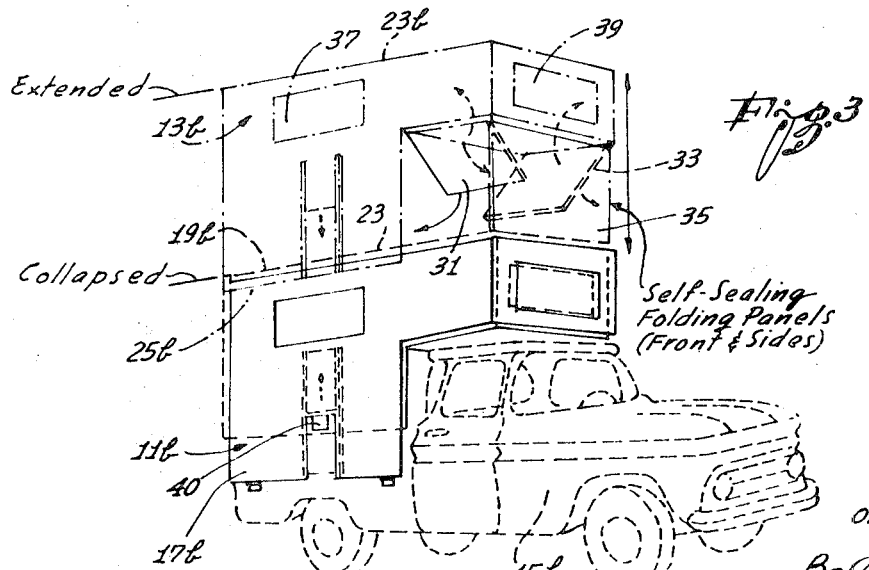

PATENTED SEP 28 1971
3,608,954
SHEET 2 OF 3
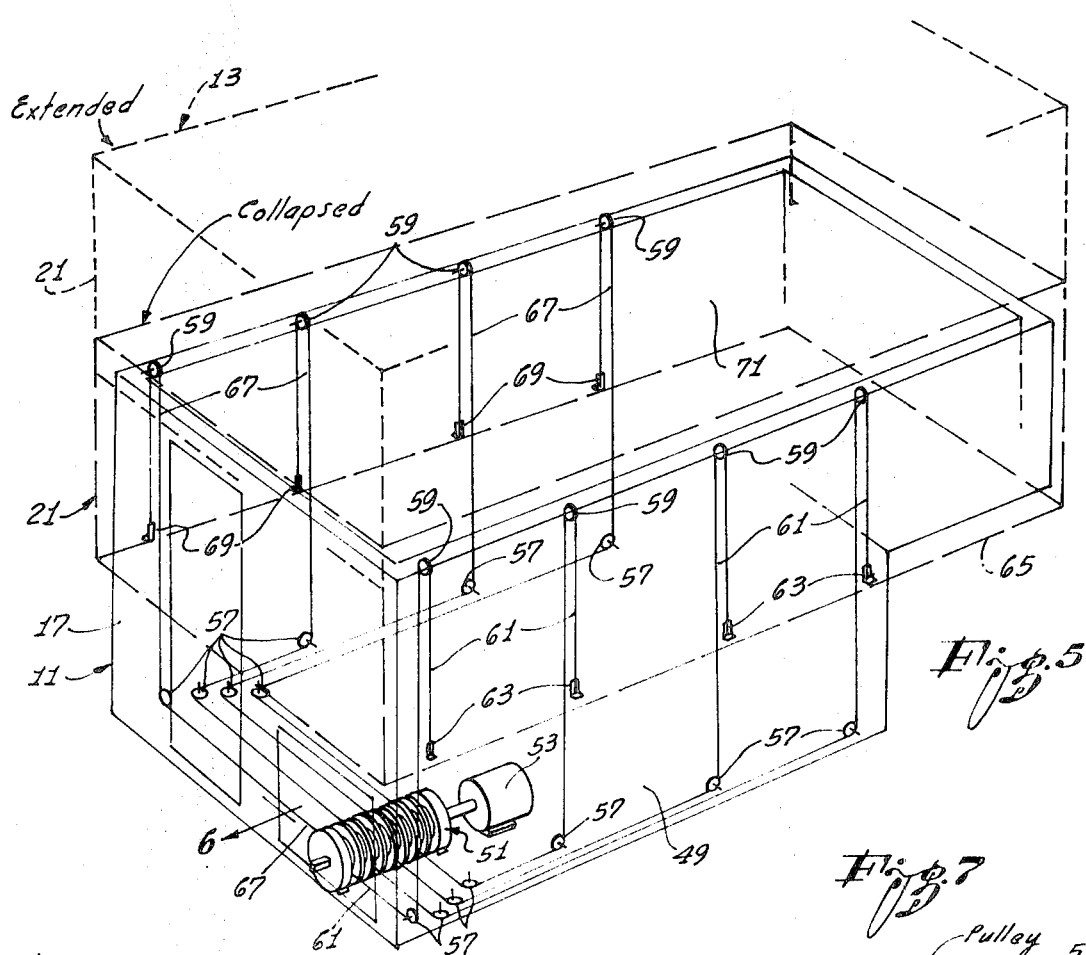
Fig. 5
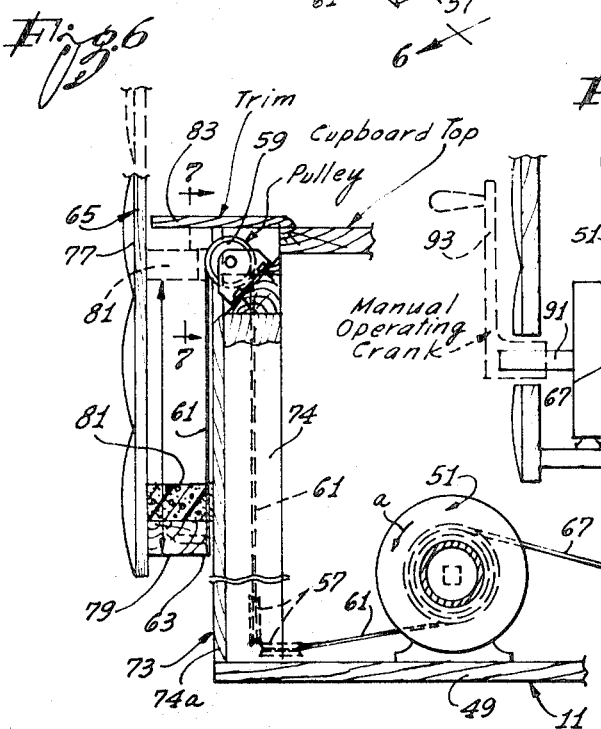
Fig. 6
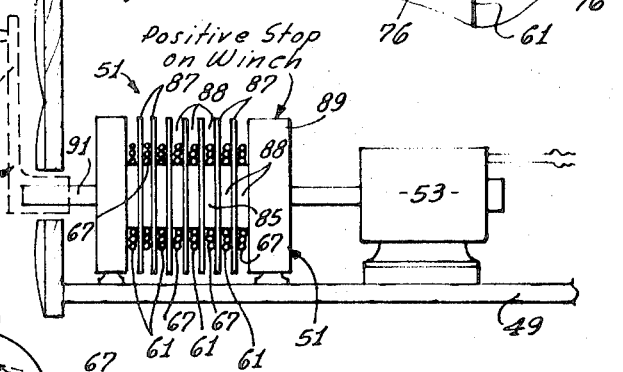
Fig. 7
Fig. 8
INVENTOR:
Orland R. Lynd
By Smyth, Roston & Pavitt
ATTORNEYS

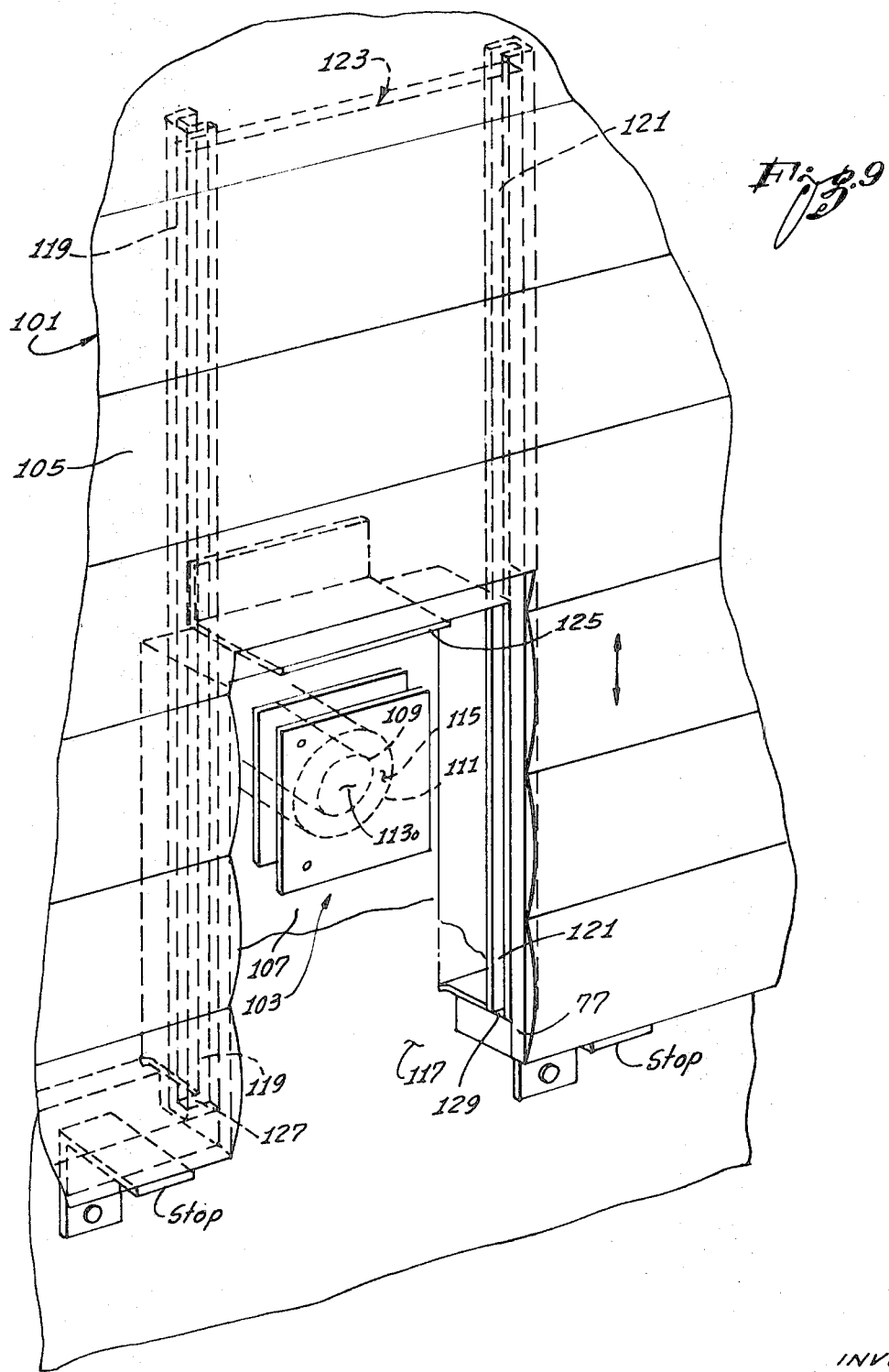

3,608,954

COLLAPSIBLE VEHICULAR STRUCTURE

BACKGROUND OF THE INVENTION

This invention relates to the provision of a collapsible extension for a vehicular cabin. As used herein, the expression vehicular cabin includes campers, trailers, mobile homes, housecars and similar structures which are suitable for human occupancy and which are vehiclelike in that they are adapted for movement from place to place.

When in transit, it is desirable that a vehicular cabin be as small as possible to reduce the windload thereon and the consequent danger of overturning as well as to generally facilitate movement of the vehicular cabin. On the other hand, once the vehicular cabin is parked, the relatively small enclosed space provided thereby is often less than desired.

Another problem to which the present invention is directed relates to the simultaneous winding of two or more cables on the drum of a winch. For many applications, it is desirable or essential that the several cables be simultaneously wound on the drum at a predetermined rate relative to each other. For example, where two or more cables are connected to a load at one end and to the drum of a winch at the other end, it will usually be necessary that the cables be wound on the drum at equal rates.

As the effective diameter of the winch increases with each layer of the cable that is wound thereon, it is necessary to accurately control the manner in which the separate layers of cable are wound on the drum. Previously, this has been accomplished with complex cable winding mechanisms to accurately control the winding of the cable on the drum.

SUMMARY OF THE INVENTION

The present invention provides substantial additional space in a vehicular cabin by providing an entire second story therefor. The second story is substantially completely collapsible for transit so that there is no material increase in wind loads and in vehicle handling problems as a result of the second story.

According to the present invention, a cabin extension is mounted on the vehicular cabin. The vehicular cabin includes a peripheral sidewall and an upper wall and the cabin extension includes a peripheral sidewall and a roof. The cabin extension is mounted on the vehicular cabin so that the former can be extended to form a second story above the vehicular cabin with the upper wall of the vehicular cabin forming the floor for the second story.

To provide a second story of sound construction, the peripheral sidewall of the cabin extension is preferably rigid rather than of the foldable flexible bellows type. Preferably the cabin extension is mounted on the vehicular cabin with the peripheral sidewalls being telescopically interrelated and with the roof of the cabin extension overlying the upper wall of the vehicular cabin. In the retracted or collapsed position, the roof of the cabin extension lies closely adjacent or contiguous the upper wall of the vehicular cabin so that the overall dimensions of the vehicular cabin are increased only slightly by the presence of the cabin extension. The cabin extension can be moved to an extended position in which the roof thereof is spaced sufficiently from the upper wall to provide a compartment of sufficient size to permit human occupancy. Although it will be normally preferable to provide a cabin extension having a roof, for some applications the roof may be eliminated.

To facilitate installation on the existing vehicular cabin, it is preferred that the peripheral sidewall of the cabin extension surround or telescopically receive the peripheral sidewall of the vehicular cabin. The space between the peripheral sidewalls can be appropriately sealed. Access to the second story can be obtained by cutting a hole through the upper wall of the vehicular cabin. It is preferred to utilize a cable and winch system to accomplish the movement of the cabin extension relative to the vehicular cabin.

Enclosed vehicular cabins often times have an opening in the peripheral sidewall thereof to provide for intake of air, for example, for air conditioner or heater and/or exhaust of air, for example, for furnaces therethrough. As it is possible to provide a cabin extension having a substantial vertical dimension, the peripheral sidewall of the cabin extension might descend sufficiently in the collapsed position to cover such opening in which event the opening would be sealed off and could not perform its intended function. The present invention provides an advantageous way for preventing the peripheral sidewall of the cabin extension from sealing off this opening in the retracted position.

The present invention also provides a multiple-cable drum for a winch. According to the present invention, the rate at which the several cables are wound on the drum is accurately controlled by simple structural means which causes a new, separate layer of cable to be wound on the drum for each revolution of the drum. With the present invention, such means includes structural elements defining a separate pocket for each of the cables with the dimension of each of the pockets axially of the drum being controlled so as to cause the new layer of cable to be wound on the drum for each revolution of the drum.

The guide means may take many structural forms and may, for example, be spaced parallel plates defining annular grooves or, for example, the guide means may include a plurality of pegs projecting outwardly from the surface of the drum with the axial spacing between pegs being controlled. The axial dimension of the groove or pocket must be at least equal to the thickness of the cable but less than twice of the thickness of the cable with optimum results being obtained when such thickness is slightly greater than the thickness of the cable. With this construction, it will be impossible for the windings of the cable to be in side by side relationship, but rather each new winding will circumscribe the previous winding. Although a drum of this type may be used in many different environments, it is particularly adapted for use in raising and lowering the cabin extension.

The invention, both as to its organization and method of operation, together with further features and advantages thereof may best be understood by reference to the following description taken in connection with the accompanying drawings.

BRIEF DESCRIPTION OF THE DRAWINGS

FIG. 1 is a perspective view of a camper having a cabin extension mounted thereon and movable between the extended and collapsed positions as indicated.

FIG. 2 is a perspective view similar to FIG. 1 of a house trailer having a different kind of cabin extension mounted thereon and movable between extended and collapsed positions.

FIG. 3 is a view similar to FIG. 1 illustrating one other form of camper and cabin extension.

FIG. 4 is a partially diagrammatic, perspective view with parts broken away to illustrate the interior of the camper and the opening to provide access to the cabin extension.

FIG. 5 is a partially diagrammatic perspective view illustrating the mounting of the cabin extension on the camper and the winch and cable arrangement for extending and collapsing the cabin extension. The extended and retracted positions of the cabin extension are also shown.

FIG. 6 is an enlarged fragmentary sectional view taken generally along line 6—6 of FIG. 5 showing the winch and cables and a preferred manner of telescopically interrelating the peripheral sidewalls.

FIG. 7 is a fragmentary elevational view taken generally along line 7—7 of FIG. 6.

FIG. 8 is an elevational view of the winch and driving mechanism therefor.

FIG. 9 is an enlarged fragmentary perspective view of the mechanism for preventing the closing off of the opening in the peripheral sidewall of the camper when the cabin extension is in the collapsed position.

DESCRIPTION OF THE PREFERRED EMBODIMENTS

Referring to the drawings and in particular to FIG. 1 thereof, reference numeral 11 designates a camper having a cabin extension or compartment extension 13 mounted thereon, with the resultant unit being mounted on a truck 15. The cabin extension 13 is movable between a retracted or collapsed position shown in full lines in FIG. 1 in which it substantially conforms to a portion of the contour of the camper 11, and an extended position shown in dashed lines in FIG. 1 in which it provides a compartment of sufficient size for human occupancy. In the form shown in FIG. 1, the cabin extension 13 does not extend a significant distance above the camper 11 in the extended position, but only sufficiently far to provide a sleeping deck.

In the form shown in FIG. 1 the camper 11 has a peripheral sidewall 17 which surround a predetermined volume and a transverse upper wall 19 which forms a roof for the camper 11. The cabin extension 13 also has a peripheral sidewall 21 which telescopically receives the peripheral sidewall 17 and a transversely extending roof 23. The peripheral sidewall 21 is preferably constructed of relatively rigid material and has a lower edge 25.

FIG. 2 shows a second embodiment of the invention in which parts corresponding to parts shown in FIG. 1 are designated by corresponding reference characters followed by the letter a. Thus, the trailer 11a of FIG. 2 includes an extendible cabin extension 13a, a peripheral sidewall 17a, and a transverse upper wall 19a. The cabin extension has a peripheral sidewall 21a, a roof 23a, a collapsible railing 27 and a window 29. The trailer 11a has wheels (not shown) to facilitate movement of the trailer. The cabin extension 13a is smaller than the cabin extension 13 and fits over a forward portion of the trailer 11a. The cabin extension 13a is telescopically mounted on the trailer 11a with the peripheral sidewalls 17a and 21a being telescopically interrelated. The cabin extension 13a is movable between extended and collapsed positions as described hereinabove. Because the cabin extension 13a covers only the forward portion of the trailer 11a, the peripheral sidewall 21a includes an inwardly foldable section 30 hinged about the upper edge thereof to the roof 23a. Thus, the telescopic relationship between walls 17a and 21a exists along three sides of the sidewall 21a.

FIG. 3 shows a third embodiment of the invention in which parts corresponding to parts in FIG. 1 are given corresponding reference characters followed by the letter a. The cabin extension 13a has a substantial vertical dimension which is much greater than the vertical dimension of the cabin extension 13. Thus, as shown in FIG. 3, the vertical dimension of the cabin extension 13b approaches the vertical dimension of the camper 11b and as such it provides a full second story for the camper. The cabin extension 13b includes two self-sealing folding panels 31 and 33 and a similar front panel 35. The panels 31, 33 and 35 are foldable inwardly as indicated by the arrows in FIG. 3 to permit movement of the cabin extension 13b to the retracted position. When the panels 31, 33 and 35 are in the down or closed position, they provide additional storage space. The cabin extension 13b has windows 37 and 39. The sidewall of the camper 11b has an opening 40 therein which remains open when the cabin extension 13b is in the retracted position as explained hereinbelow with reference to FIG. 9.

FIG. 1–3, when considered together, amply demonstrate that the concepts of this invention are applicable to campers and cabin extensions of various sizes and shapes. Furthermore, the concepts of this invention are not restricted to campers but are equally applicable to other types of vehicular cabins such as trailers, mobile homes, etc.

FIG. 4 illustrates a preferred manner of providing access to a cabin extension 41 from a vehicular cabin 43. The vehicular cabin 43 has an upper wall 45 with an opening 47 therein of sufficient size to permit human passage therethrough into the cabin extension 41. The use of an opening in the upper wall to provide access to the cabin extension is applicable to all of the embodiments of the present invention. The opening 47 can be closed by a cover 48.

FIG. 5 illustrates a preferred manner of mounting the cabin extension 13 on the camper 11 and a preferred manner of providing a relative movement therebetween. As shown in FIG. 5 the cabin extension 13 and the camper 11 are both generally rectangular in plan, and the rectangular peripheral sidewall 17 of the camper is snugly received within the peripheral sidewall 21 of the cabin extension 13.

The camper 11 has a floor 49, and a winch 51 is mounted on the floor 49 and is driven by a motor 53. A suitable number of lower pulleys 57 and upper pulleys 59 are mounted on the floor 49 and adjacent the upper end of the peripheral sidewall 17, respectively. A first group of cables 61 are attached at one end of any suitable connector 63 to a side 65 of the peripheral sidewall 21 and the opposite ends of the cables 61 are wound on the winch 51. The connectors 63 are preferably mounted on the interior of the side 65 so that the cable 61 and the connectors will be hidden from view. As shown in FIG. 5, the cable 61 passes over the pulleys 59 and 57 and then extends to the winch 51.

Similarly, a second group of cables 67 is secured at one end by connectors 69 to the interior of the opposite side 71 of the peripheral sidewall 21. The opposite ends of the cables 67 are secured to the winch 51 and are windable thereon.

FIG. 6 illustrates some of the details of a preferred cable and pulley arrangement for moving the cabin extension 13 between the extended and retracted positions. The camper 11 has a sidewall 73 which forms one side of the peripheral sidewall 17. In the form illustrated the sidewall 73 includes a plurality of spaced vertical studs 74 and one or more side panels 74a affixed to the studs 74. The pulleys 57 and 59 are suitably mounted in vertically extending spaces or slots 75 between adjacent studs 74. As shown in FIGS. 6 and 7, the pulleys 59 are mounted by a pair of brackets 76 to an upper portion of the sidewall 73. Each of the cables 61 rides over its associated pulley 59 and is mounted by one of the connectors 63 to the lower inside edge of the side 65.

Although the side 65 can be constructed in many different ways, in the form shown in FIG. 6, it includes an outer panel 77 suitably mounted on a horizontal frame member 79. The fastener 63 secures the cables 61 to the frame member 79. A seal 81 of resilient material is mounted on the frame member 79 and the outer panel 77 and extends into sealing engagement with the outer surface of the sidewall 73 to thereby form a dust tight seal between the peripheral sidewalls 17 and 21. A trim panel 83 covers the upper end of the opening between the panel 77 and the outer surface of the sidewall 73.

In the embodiment illustrated, the winch 51 includes a drum 85 (FIG. 8) on which the cables 61 and 67 can be wound and a plurality of discs 87 mounted on the drum 85 in axially spaced parallel relationship to define therebetween several annular spaces or pockets 88 with one of the spaces being provided for each of the cables 61 and 67. The axial spacing between adjacent discs 87 or the axial dimension of the pockets 88 should be at least equal to the width of the cable to be wound therein but less than twice the width of that cable. Cable width as used herein has reference to the dimension of the cable axially of the drum 85 as the cable is wound on the drum. In the embodiment illustrated, the cables 61 and 67 are circular in transverse cross section and hence the width thereof is the diameter. However, the present invention is not restricted to cables of any particular cross sectional shape.

In the embodiment illustrated, the axial dimension of the pocket 88 is slightly greater than the diameter of the cable which is to be wound therein. By making the axial width of the pocket 88 slightly greater than the cable diameter, the cable can be easily wound therein without binding even if the cable distorts slightly due to the load imposed thereon. The winding of the cable is confined axially of the drum so that each revolution of the drum produces a separate layer of cable which circumscribes the previously wound layer.

In the embodiment illustrated, it is desired that each of the cables 61 and 67 be wound on the drum 85 at an equal rate. To accomplish this, the several regions of the drum 85 on which the cables 61 and 67 are to be wound have equal circumferential dimensions and the thicknesses, i.e., the dimension of the cables 61 and 67 radially of the drum 85 as the cable is wound on the drum, are equal. With this arrangement, the effective drum diameter will increase an equal amount for each of the cables 61 and 67 so that a constant rate of reeling in is obtained. An equal rate of travel for each of the cables is necessary in order that the cabin extension is evenly moved between the extended and retracted positions thereof.

The winch has also a positive stop 89 which automatically locks the drum 85 in position when the drum stops rotating. Although there are many different kinds of positive stops which may be used, in the embodiment illustrated, the positive stop 89 includes a gear reduction unit which causes the drum 85 to turn at a substantially lesser speed than the motor 53. The amount of gear reduction is selected so that it will not be possible for the weight of the cabin extension 13 to counter-rotate the drum 85 by exerting a force on the cables 61 and 67. Accordingly, when the motor 53 is deenergized, the cabin extension 13 remains in the position to which it has been moved.

In order that the single winch 51 can simultaneously wind in the cables 61 and 67, which extend in opposite directions, it is necessary that each of the cables separate from the winch 51 at locations spaced 180° apart as shown in FIG. 6. In the embodiment illustrated, the motor 53 is 12 volt reversible DC motor although other kinds of motors can be utilized. The winch 51 has a stub shaft 91 which projects through an opening in the peripheral sidewall to permit a manually operated crank 93 to be used in lieu of the motor 53 to move the cabin extension 13 between the extended and retracted positions. Of course, the construction shown in FIGS. 5–8 can be utilized with any of the embodiments of this invention.

When the cabin extension 13 is in the retracted position, the roof 23 thereof lies closely adjacent or contiguous the upper wall 19 of the camper 11. This constitutes the lowest possible position which the cabin extension 13 can assume relative to the camper 11.

To move the cabin extension 13 to the extended position the motor 53 is energized to drive the drum 85 in the direction of the arrow a (FIG. 6), to thereby reel in the cables 61 and 67 with consequent elevation of the cabin extension 13 relative to the camper 11. Alternatively, the crank 93 may be utilized to turn the stub shaft 91 and the drum 85 to elevate the cabin extension 13.

When the extended position is reached, the motor 53 is deenergized and the cabin extension 13 is held in the extended position by the positive stop 89 on the winch. To lower the cabin extension 13, the motor is energized in the opposite direction.

It will be appreciated that the upper story of the camper 11 is defined by the peripheral sidewall 21 and the roof 23 of the cabin extension 13 and by the upper wall 19 of the camper 11. The vertical dimension of the second story may vary depending upon the use to which the second story is to be put. For example, if the second story is to constitute a sleeper, it need not have a substantial vertical dimension. On the other hand, if full utilization is to be made of the second story or if substantial overhead clearance is desired for the sleeping compartment, the second story may have a substantial vertical dimension and actually approach the vertical dimension of the camper 11.

FIG. 9 illustrates another feature of the present invention which may be applied to the embodiments of FIGS. 1–3 as well as many different kinds of the particular cabins. In FIG. 9, a cabin extension 101 is mounted on a vehicular structure such as a camper 103 in any suitable manner such as that illustrated in FIG. 5. The cabin extension 101 has a roof (not shown) and a peripheral sidewall 105, and the camper 103 has an upper wall (not shown) and a peripheral sidewall 107 with the peripheral sidewalls being arranged in telescoping relationship. The particular construction of the cabin extension 101 and the camper 103 may be in accordance with any of the embodiments disclosed hereinabove.

The camper 103 has a pair of concentric conduits 109 and 111 extending through a suitable location in the peripheral sidewall 107 thereof. The conduits 109 and 111 define air passages or openings 113 and 115. One of the passages 113 and 115 is used to supply ventilating air to the interior of the camper 103 while the other of the openings is utilized for exhausting air from the interior of the camper. The passages 113 and 115 must remain open regardless of the position of the cabin extension 101.

According to the present invention, the peripheral sidewall 105 of the cabin extension 101 is formed with an aperture 117 which is in registry with the passages 113 and 115 when the cabin extension 101 is in the retracted position shown in FIG. 9. In the embodiment illustrated, the aperture 117 is in the form of a generally rectangular recess or notch formed in the lower periphery of the peripheral sidewall 105 and extending vertically upwardly a sufficient distance to expose the passages 113 and 115 when the cabin extension 101 is in the collapsed position.

If the aperture 117 were permitted to remain open with the cabin extension in the extended position, the peripheral sidewall 105 of the cabin extension would have a large open area, and accordingly, the camper extension 101 would be incapable of shielding the occupants thereof. Accordingly, the cabin extension 101 is provided with tracks 119 and 121 which extend vertically along the opposed vertical edges of the aperture 117 and for a distance above the aperture 117. The amount which the tracks 119 and 121 extend above the upper edge of the aperture 117 can vary; however, it is preferred that they extend above the aperture 117 for a distance which is at least equal to the vertical dimension of the aperture 117.

In the embodiment illustrated, each of the tracks 119 and 121 is in the form of an elongated channel mounted on the peripheral sidewall 105. In the embodiment illustrated, the channels 119 and 121 are built into the wall 105 along the vertical edges of the aperture 117; however, the channels may be mounted on the exterior surface of the wall 105 if desired. The channels open toward each other to slidably receive the opposed vertical edge portions of a panel 123. The panel 123 may be of various sizes and configurations, but it should preferably conform substantially to the shape of the aperture 117 so that it can cover such aperture when the cabin extension 101 is in the extended position. Accordingly, in the embodiment illustrated, the panel 123 is generally rectangular and of an area slightly larger than the area of the aperture 117 to completely close the latter. In the broad sense, the channel 123 need only be sufficiently large to cover that portion of the aperture 117 which will lie above the upper wall of the camper 103 when the cabin extension 101 is in the extended position.

The lowermost position of the panel 103 is fixed by a stop 125 which, in the embodiment illustrated, is in the form of a right-angle bracket mounted on the peripheral sidewall 107 of the camper 103 and projecting through the aperture 117 adjacent the upper edge thereof. The lower ends of the tracks 119 and 121 are closed by members 127 and 129, respectively.

With the cabin extension 101 in the lower or collapsed position shown in FIG. 9, the stop 125 engages the lower edge of the slidable panel 123 to prevent the latter from closing that portion of the aperture 117 which is in registry with the passages 113 and 115. Accordingly, air can pass through these passages between the interior of the camper 103 and the exterior of the vehicle. In this position, the panel 123 confronts a portion of the peripheral sidewall 105.

When it is desired to move the cabin extension 101 upwardly to the extended position, the tracks 119 and 121 are moved upwardly with the cabin extension. During the initial phase of upward movement of the cabin extension 101, the panel 123 slides in the tracks 119 and 121 and remains, due to its own weight, in its lowermost position in engagement with the stop 125. However, when the members 127 and 129 which close the lower ends of the tracks 119 and 121 engage the lower corners of the panel 123, the panel is lifted upwardly thereby and relative movement of the panel relative to the tracks ceases.

It will be appreciated that during the so-called initial phase of movement that the aperture 119 is being progressively closed by the panel 123 and that when the members 127 and 129 engage the lowermost corners of the panel 123 the aperture 117 is completely closed. Suitable seals may be provided, if desired, along the tracks 119 and 121 so that the panel 123 can tightly seal the aperture 117. In moving the cabin extension 101 from the extended position back to the collapsed position, the panel 123 will move downwardly with the cabin extension until the lower edge thereof engages the stop 125 at which point, further movement of the panel 123 is arrested and the cabin extension 101 moves relative thereto to progressively expose the aperture 117.

Although exemplary embodiments of the invention have been shown and described, many changes, modifications and substitutions may be made by one having ordinary skill in the art without necessarily departing from the spirit and scope of this invention.

I claim:

1. A two story collapsible vehicular structure comprising:
   a vehicular cabin having a peripheral sidewall and an upper wall, said vehicular cabin being adapted for human occupancy and adapted to have at least one wheel mounted thereon for supporting said vehicular cabin for movement along a supporting surface;
   a cabin extension having a peripheral sidewall and a roof;
   means for telescopically mounting said cabin extension on said vehicular cabin for movement of said cabin extension between an extended position in which said roof lies above said upper wall and is spaced a sufficient distance therefrom to provide a chamber of sufficient size for human occupancy and a collapsed position in which said roof lies closely adjacent said upper wall whereby said cabin extension can be moved to said collapsed position for transit and to said extended position when the vehicular structure is stationary to provide an upper story for the vehicular structure;
   said cabin extension covering only a portion of said upper wall of said vehicular cabin, a section of the peripheral sidewall of said cabin extension overlying said upper wall in said extended position; and
   means for mounting said section of said peripheral sidewall on at least one of said cabin and said cabin extension for movement to a position to permit said cabin extension to be moved to said collapsed position.

2. A structure as defined in claim 1 wherein said last-mentioned means mounts said section of said peripheral sidewall on said cabin extension for hinged movement in a direction to allow the cabin extension to be moved to the collapsed position.

3. A collapsible vehicular structure as defined in claim 1 including a drum, means for mounting said drum for rotation, first and second cables connectable to the drum and to one of the vehicular cabin and the cabin extension, first guide means for confining the first cable as the first cable is being wound on the drum so that a separate layer of the first cable is wound on the drum for each revolution of the drum, and second guide means for confining the second cable as the second cable is being wound on the drum so that a separate layer of the second cable is wound on the drum for each revolution of the drum whereby the rate at which cables are wound on the drum can be predetermined.

4. A structure as defined in claim 3 wherein the first and second cables are of substantially equal thickness and are wound on first and second regions of the drum, respectively, the circumferential dimensions of said drum at said regions being substantially equal whereby the first and second cables are wound on the drum at substantially the same rate.

5. A vehicular structure as defined in claim 1 wherein said vehicular cabin has an opening in the peripheral sidewall thereof, the peripheral sidewall of the cabin extension being at a sufficiently low level in said collapsed position as to cover said opening and having a aperture therein in communication with said opening in said collapsed position whereby air can pass through said opening and said aperture between the exterior of said vehicular structure and the interior of said vehicular cabin when said cabin extension is in said collapsed position, and means responsive to movement of said cabin extension from the collapsed position toward the extended position for closing said aperture.

6. A collapsible vehicular structure as defined in claim 5 including a drum, means for mounting said drum for rotation, first and second cables connectable to the drum and to one of the vehicular cabin and the cabin extension, first guide means for confining the first cable as the first cable is being wound on the drum so that a separate layer of the first cable is wound on the drum for each revolution of the drum, and second guide means for confining the second cable as the second cable is being wound on the drum so that a separate layer of the second cable is wound on the drum for each revolution of the drum whereby the rate at which cables are wound on the drum can be predetermined.

7. A vehicular structure as defined in claim 5 wherein said upper wall has an opening therein of a sufficient size to permit human passage therethrough between said chamber and said vehicular cabin, said peripheral sidewalls are telescopically interrelated and are relatively rigid, said vehicular structure also including seal means between said peripheral sidewalls for forming a seal therebetween when said cabin extension is in either of said positions thereof, a winch mounted in fixed relationship to said vehicular cabin, a cable having one end thereof secured to said cabin extension on the other end thereof secured to said winch, said winch being rotatable to move said cabin extension between said positions thereof.

8. An extendible vehicular structure comprising:
   a vehicular cabin having a peripheral sidewall and an upper wall, said vehicular cabin being adapted for human occupancy and being adapted to have at least one wheel mounted thereon, said peripheral sidewall having an opening therein to permit air flow between the interior of said vehicular cabin and the exterior of said vehicular structure;
   a cabin extension including peripheral means for forming an extension of said peripheral sidewall of said vehicular cabin;
   means for telescopically mounting said cabin extension on said vehicular cabin for movement between an extended position in which said peripheral means projects a substantial distance above said peripheral sidewall and a retracted position in which said peripheral means lies substantially below its location in said extended position whereby said cabin extension can be moved to said retracted position for transit and to said extended position when the vehicular structure is stationary to provide an additional space for the vehicular structure;
   the peripheral means of said cabin extension being at a sufficiently low level in said retracted position as to cover said opening;
   said peripheral means having an aperture therein in communication with said opening in said retracted position whereby air can pass through said opening and said aperture between the exterior of said vehicular structure and the interior of the vehicular cabin when said cabin is in said retracted position; and
   means responsive to movement of said cabin extension from said retracted position toward the extended position for closing said aperture.

9. A vehicular structure as defined in claim 8 wherein said last mentioned means includes a panel mounted on said peripheral means for movement relative thereto and closing the aperture in said extended position and a stop mounted on said vehicular cabin for preventing said panel from moving downwardly to cover said aperture when said cabin extension is moved to said retracted position.